June 27, 1961  V. F. MICHAEL  2,990,031
COOLING TOWER DIVERTER
Filed Sept. 20, 1957
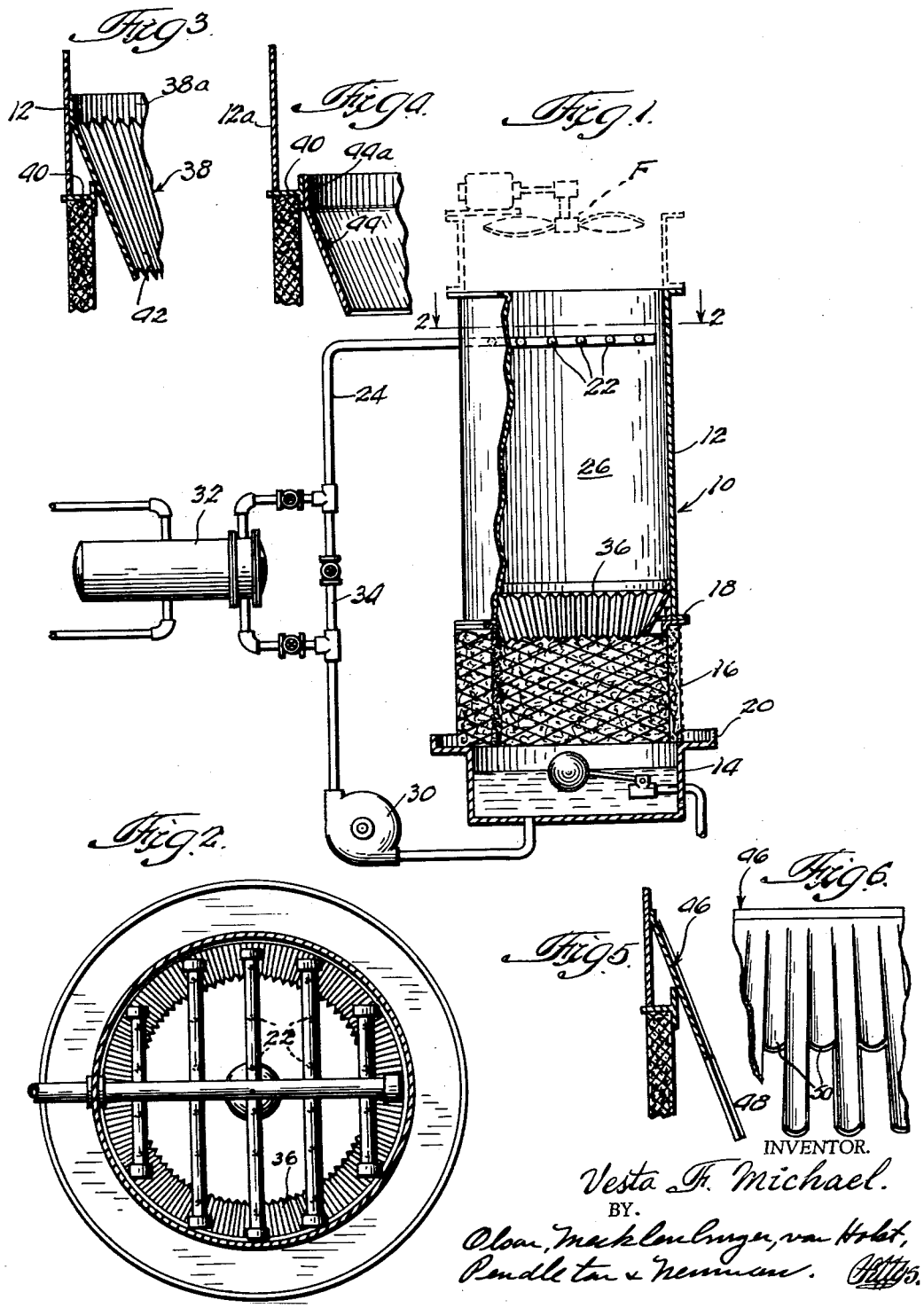
INVENTOR.
Vesta F. Michael.

United States Patent Office 2,990,031
Patented June 27, 1961

2,990,031
COOLING TOWER DIVERTER
Vesta F. Michael, Wichita, Kans., assignor to Koch Engineering Company, Inc., Wichita, Kans., a corporation of Kansas
Filed Sept. 20, 1957, Ser. No. 685,340
5 Claims. (Cl. 183—13)

The present invention pertains to a diverter for a cooling tower whereby the flow of air therethrough may be facilitated.

In the copending application of Fred C. Koch, Serial No. 544,283, filed November 1, 1955, now Pat. No. 2,889,003, dated June 2, 1959, and assigned to the Koch Engineering Company, Inc., a cooling tower is disclosed with which the diverter of this invention is intended to be used. The latter tower comprises an enclosure having an open upper end limit in communication with the surrounding atmosphere. A plurality of downwardly disposed sprays in communication with warm water which is to be cooled is disposed across the tower adjacent the open end. In the normal course of operation, the water to be cooled is sprayed downwardly into the tower; the descending water creates a downward draft pulling in air through the tower open end which functions to cool the warm water by evaporation. An air-permeable water-de-entraining section is peripherally disposed about the tower adjacent the lower end limit thereof, thereby enabling the air to flow from the tower interior. Water entrained in the air is filtered out at the de-entraining section and flows into an underlying basin from which it is cycled for a particular cooling use.

It has been found, however, that, in the course of the cooling operation, a portion of the water being sprayed downwardly collects on the interior walls of the tower and flows downwardly over the surface of the underlying water-de-entraining, air-permeable section. The quantity of down-flowing water increases, obviously, as the water flow through the sprays increases. At high rates of flow the water being cooled may flow over the interior walls of the cooling tower onto the underlying water-de-entraining section in the form of sheets. The water flowing over the de-entraining section, which is composed of a material such as glass wool, greatly impairs the flow of air therethrough, functioning as a barrier, and thus deleteriously affects the overall-efficiency of the tower.

It is an object of this invention, therefore, to provide a diverter for a cooling tower employing an air-permeable water-de-entraining section whereby water draining down the walls of an overlying tower portion will be prevented from contacting the de-entraining section.

It is another object of this invention to provide a cooling tower diverter which is inexpensive to fabricate and install, thereby adding little to the tower cost.

It is a further object of this invention to provide a corrugated diverter for use with a water-cooling tower which forms the down-flowing water in the tower into solid spaced-apart streams which do not contact the water-de-entraining means whereby the air flow through the latter de-entraining means confronts a minimum of resistance.

It is a still further object of this invention to provide a cooling tower diverter which permits the use of large openings in the mist eliminator de-entraining means without danger of water passage thereby resulting in higher tower efficiencies.

The above and other objects of this invention will become more apparent from the following description when read in the light of the accompanying drawing and appended claims.

In one embodiment of the tower diverter, the diverter when normally assembled with an associated cooling tower having an annular cross section is in the configuration of an inverted cone frustrum. The larger diameter edge of the diverter is secured in fluid-sealing engagement to a peripheral portion of the cooling tower disposed above the underlying water-de-entraining section. The opposed smaller diameter of the inverted cone frustrum diverter is disposed beneath the top peripheral portion of the water-de-entraining means employed in the cooling tower, in the normal position of assembly.

Since the diverter has a sloping surface converging toward a theoretical apex, the bottom peripheral edge of the diverter is uniformly spaced from the adjacent water-de-entraining section of the cooling tower. As a result the downwardly spraying water which collects on the tower walls disposed above the water-de-entraining section flows into the underlying diverter and drops from the lower peripheral edge thereof into an underlying basin portion of the tower. Because of the spacing of the lower edge of the diverter from the water-de-entraining section, no water flows over the de-entraining means of the tower in the form of a sheet.

In the preferred embodiment, the surface of the frusto-conical diverter has a plurality of flutes or corrugations disposed therein which are uniformly disposed and converge toward the theoretical apex of the cone of which the diverter is a frustrum. The diverter may be uncorrugated, however, as illustrated in the diverter fragment of FIG. 4.

In another embodiment of the provided diverter, alternate corrugations of long and short lengths are formed in a frusto-conical diverter peripherally relieved about its edge of lesser diameter whereby the water collecting in the corrugations flows therefrom in solid streams which form concentric circles of varying diameters. The shorter corrugations will form streams defining a circle of larger diameter than the circle formed by the streams flowing from the longer corrugations. Therefore, while the corrugations serve the purpose of collecting the down-flowing water into solid streams so as to leave adequate spaces therebetween for air passage through the water-de-entraining means, the diverter formed of long and short corrugations staggers the arrangement of the solid water streams so as to facilitate passage of the air therethrough in the course of flowing to the air-permeable water-de-entraining section of the tower, as will hereinafter become more apparent.

For a more complete understanding of this invention reference should now be made to the drawing, wherein:

FIGURE 1 is a sectional view partly in elevation illustrating a water-cooling tower employing the diverter of this invention;

FIG. 2 is a sectional view taken on line 2—2 of FIG. 1;

FIG. 3 is an enlarged fragmentary sectional view illustrating the connection between the diverter of FIG. 1 and the adjacent tower wall;

FIG. 4 is a fragmentary sectional view similar to FIG. 3 of a modefied form of diverter;

FIG. 5 is a fragmentary sectional view of a second modified form of diverter illustrating its connection with the supporting tower wall; and FIG. 6 is a fragmentary elevational view of the diverter illustrated in FIG. 5.

Referring now more particularly to FIG. 1, a cooling tower 10 is illustrated comprising an upper shell or enclosure portion 12 which is disposed above a bottom reservoir or basin portion 14. Intermediate these latter two tower portions is a peripheral water-de-entraining section 16 which tightly abuts against a lower flange 18 defining the lower end limit of the tower shell portion 12 and the annular troughlike portion 20 which defines the upper end limit of the basin portion 14 of the provided tower. The water-de-entraining section 16 is readily air permeable but prevents the escape of fine water particles to the exterior of the tower for reasons which will hereinafter be made more apparent. Reinforcing rods (not shown) may be utilized in maintaining tower sections 12 and 14 in spaced-apart relationship.

Inserted across the tower cross-sectional area adjacent the upper open end limit thereof is a plurality of spray members 22, more clearly shown in FIG. 2. As has previously been mentioned, it is the purpose of a cooling tower to cool warm liquids, by contacting the same with air having a wet bulb temperature which is lower than the temperature of the liquid. If the temperature conditions are as above stated, the water is rapidly cooled by evaporation. Also, if the unsaturated air is cooler than the water with which it is brought into contact, the water is also cooled by the transfer of sensible heat to the air.

The warm water which enters the sprays 22 through conduit 24 is broken up into fine particles and immediately cooled by evaporation effected by air being drawn into a tower chamber 26 by means of the draft created by the descending water spray particles. It is to be noted that the descending water particles emerging from the sprays 22 create a draft which adequately cools the warm water entering through conduit 24 without the use of an auxiliary power-driven fan means. Such a fan means F shown in dotted lines in FIG. 1 is optional and may be employed where a very large air flow is desired. The benefit of tower operation without utilizing a power-driven fan is obvious in that installation expense and power consumption are eliminated, in addition to the initial expense and maintenance costs of the fan itself.

In the normal course of tower operation, the water is sprayed downwardly into the tower chamber 26 for purposes of drawing in air which will cool the water. The air enters through the open end of the shell 12 and escapes through the water-de-entraining peripheral section 16. In the course of its downward travel, the warm water is cooled and collects in the underlying basin 14 from which it is forced by pump 30 through heat exchanger 32 where its heat-absorbing capacities may be utilized. By-pass line 34 enables the recycling water in the basin to by-pass heat exchanger 32 when a lower temperature cooling water is desired.

In the absence of illustrated diverter 36, a portion of the downwardly spraying water emerging from the sprays 22 would collect on the walls of the tower shell 12 and flow downwardly thereover either in discrete streams or in the form of solid sheets. If a large quanity of water is being sprayed through the nozzles at a rapid rate, the water would continue to flow from the tower shell over the surface of the underlying water-de-entraining section 16 despite the material of composition of the latter section, whether it be glass wool or other fibrous material. The water flowing over the surface thereof functions as a barrier clogging the air passageways or interstices of the section 16 and, as a result, restricts the passage of air therethrough, resulting in turn, in decreased tower efficiency.

Utilizing diverter 36, the down-flowing water moving over the inner wall portions of the shell 12 flows onto the diverter 36 and drops therefrom, to the underlying basin without having an opportunity to flow over the surface of the de-entraining section 16. As will be noted from FIGS. 1 and 2, diverter 36 has the configuration of a cone frustrum in its normal position of assembly. As will be most clearly seen in FIG. 3, the lower end limit of the shell 12 is provided with an annular channel member 40 of T-shaped cross-sectional configuration. The latter channel supportingly engages an annular peripheral portion of the diverter 38 as illustrated. It will be noted, however, that the lower surface portion of the diverter area has a plurality of corrugations uniformly disposed therein which converge toward the apex of the theoretical cone of which the illustrated frustrum comprises a part. Because of the latter corrugations, it is apparent that large openings are present between the T-shaped channel 40 and the peripheral portion of the diverter 38 supported thereby. The upper portion 38a of the illustrated diverter of FIGS. 1 through 3 is accordingly left uncorrugated and is shaped so as to engage the adjacent portion of the shell inner periphery in fluid sealing relationship. As a result, upper portion 38a of the illustrated diverter prevents water from flowing into the interface between the diverter and the cooling tower shell.

As a result of these latter corrugations, water draining from above collects in discrete streams having large air openings therebetween affording the cooling air which must escape from the tower chamber 36 a large area through which it may pass into, and thence through the de-entraining section 16.

FIG. 4 illustrates a modified manner in which diverter 44 may be secured to T-channel 40 of the illustrated shell fragment 12a. It will be noted from FIG. 4 that the peripheral portion 44a of the illustrated diverter engages the vertical portion of the T-channel 40 in a flush fluid-tight engagement instead of engaging the shell wall directly. In FIG. 4, it is seen that T-channel 40 defines a water-collecting channel from which the collected water will spill over after a predetermined volume has collected therein.

FIGURES 5 and 6 illustrate a second modified form of cooling tower diverter in which long and short corrugated portions are alternately spaced over the entire surface of the cone frustrum defined by such diverter. Diverter 46 illustrated in FIGS. 5 and 6 employs long corrugated portions 48 which alternate with shorter corrugated portions 50. It will be most apparent from FIG. 5 that the water draining from the lower end limits of the short corrugations will define a circle of solid fluid streams which has a larger diameter than that circle defined by the fluid streams draining from the longer corrugated portions 48 of the diverter 46. As a result, the solid streams are staggered and provide greater opportunity for the outgoing air to traverse the same without difficulty in the course of reaching the de-entraining section 16.

The provided diverter imparts to a tower utilizing the same a number of advantages previously outlined. The de-entraining means may have larger air passage openings, since the opportunity afforded water for passing therethrough has been greatly reduced. Most importantly, however, the barrier created by a water film on the surface of tower portion 16 has been obviated, since no stream or other liquid flow may move thereover in view of the diverter. As a result of employing the provided diverters over-all tower efficiencies are increased anywhere from 15 to 20 percent. The provided diverter is obviously simple to install in an already existing tower construction, has a small initial cost and requires no maintenance. The diverter sloping surfaces may be disposed at various angles to the lower walls; the illustrated angle of 20 degrees, for instance, is satisfactory.

In view of the foregoing, it is believed that the number of diverter modifications which may be made in the light of the inventive concepts disclosed herein is apparent. The diverter employed need not be frusto-conical as, for instance, in a tower of rectilinear cross-sectional configuration. The governing principle is that the diverter should have an upper peripheral edge adapted to snugly engage a tower wall portion disposed above the top edge of the water-de-entraining section and a lower peripheral edge disposed within or beneath the de-entraining section edge end limits.

Also, the number of corrugated portions of a diverter may vary greatly and are not limited to corrugated portions of equal length or alternating corrugated portions of two dissimilar lengths. The method of forming the fluid-tight seal with the shell inner surface is not of great importance and may be effected in a number of ways as illustrated. It is intended, therefore, that this invention be limited only by the scope of the appended claims.

I claim:

1. In a cooling tower comprising an open-end enclosure having spray means disposed therein adjacent said open end adapted to spray liquids to be cooled into said tower interior in the general direction of the bottom of said tower, and air-permeable water-de-entraining means defining a peripheral portion of said tower bottom, the improvement comprising deflector means of inverted frusto-conical configuration having its larger peripheral end portion disposed in fluid-sealing engagement with a peripheral wall portion of said tower disposed about the upper edge end limit of said water-de-entraining means between said spray means and said water-de-entraining means whereby water draining down the walls of said tower engages said deflector means, by-passing said water-de-entraining means, and flows from the deflector smaller opening into said underlying tower bottom.

2. The cooling tower as recited in claim 1 in which said deflector wall defines an angle of about 20 degrees with said tower walls.

3. A deflector for use in a cooling tower employing a water-de-entraining, air-permeable section, said deflector having an upper peripheral portion adapted and formed to snugly engage a tower inner peripheral portion in fluid-sealing engagement, said tower peripheral portion being disposed above said air-permeable section, said deflector also having a lower peripheral portion disposed beneath said air-permeable section upper edge in the normal position of assembly, said deflector surface having converging channels formed therein.

4. The deflector as recited in claim 3 in which said channels are of unequal length.

5. The deflector as recited in claim 1 in which converging corrugations are formed in said deflector surface.

References Cited in the file of this patent

UNITED STATES PATENTS

| | | |
|---|---|---|
| 810,450 | White | Jan. 23, 1906 |
| 1,163,339 | Hauss | Dec. 7, 1915 |
| 1,459,461 | Austin | June 19, 1923 |
| 1,475,639 | Lyle et al. | Nov. 27, 1923 |
| 1,665,455 | Handelan | Apr. 10, 1928 |
| 1,848,576 | Sandel | Mar. 8, 1932 |
| 1,986,653 | Wade | Jan. 1, 1935 |
| 2,349,777 | Utterback et al. | May 23, 1944 |
| 2,562,827 | Simpson | July 31, 1951 |
| 2,639,130 | Heere | May 19, 1953 |